Patented Dec. 29, 1931

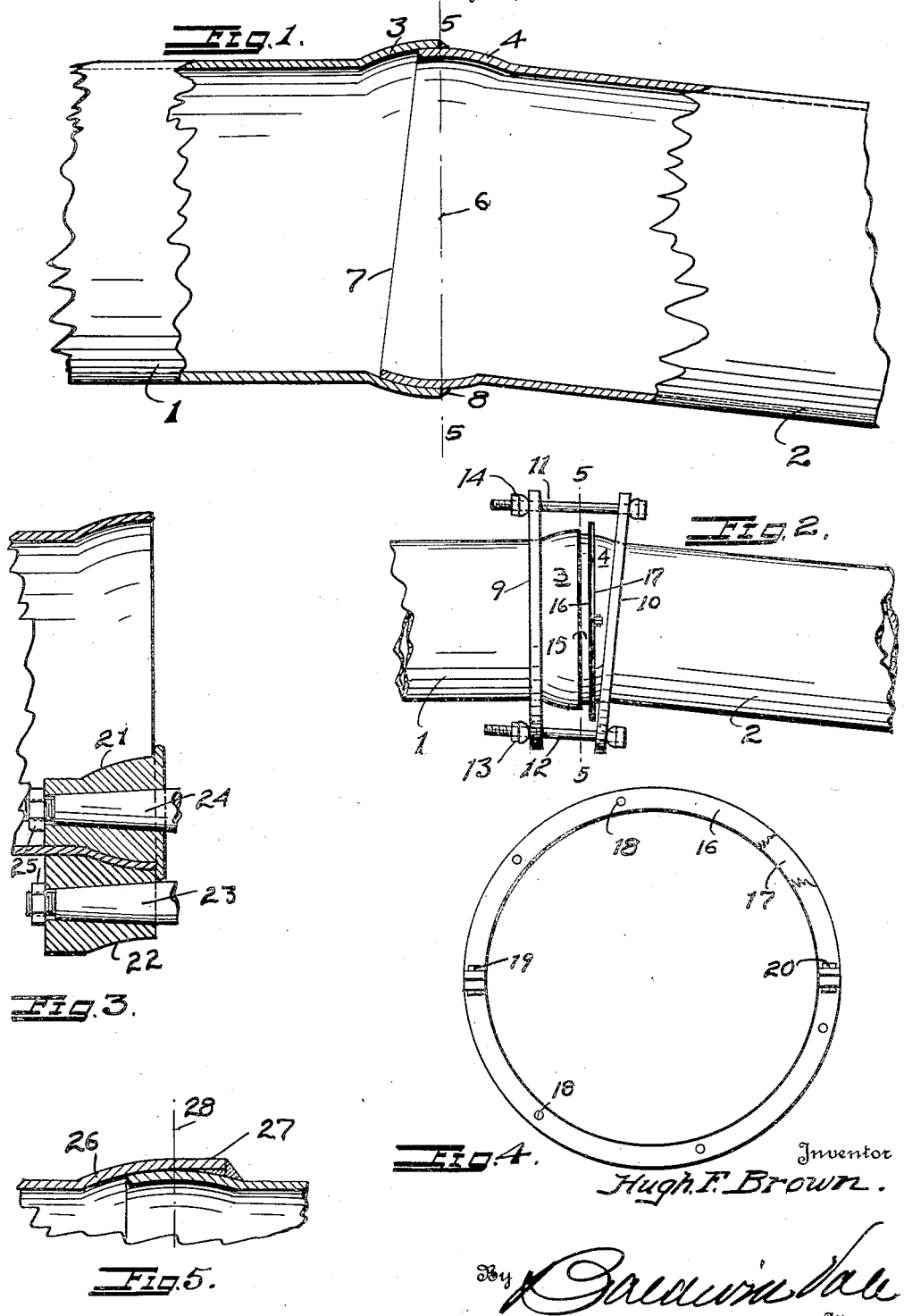

1,838,249

UNITED STATES PATENT OFFICE

HUGH F. BROWN, OF SAN FRANCISCO, CALIFORNIA

METHOD OF WELDING PIPE JOINTS

Application filed July 16, 1929. Serial No. 378,726.

This invention relates to improvements in welded pipe joints and the method of forming the same, and more particularly to pipe joints in which the pipes can be drawn up tightly together before being welded in position.

An object of the invention is to provide a joint for pipes in which the ends of the sections of pipe can be welded in a straight line or at an angle.

Another object is to provide a pipe joint having more surface contact, and provide means to draw the surfaces tightly together.

Another object is to expand and telescope the ends of the pipes to be joined so that the pipe sections may be joined at an axial angle to each other without straining the weld.

Another object is to form a spheroidal expanded portion on the end of the pipe, forming in effect a ball joint before welding.

Another object of the invention is the provision of pipe joints that will adjust themselves to trench contours and angles without the necessity of cutting the pipe ends before welding.

Other objects and advantages will appear as the description progresses.

In this specification and the accompanying drawings, the invention is shown in the form considered to be the best, but I do not wish to be understood as limiting it to this form because it may be embodied in other forms. It is also to be understood that in and by the claims following the description it is desired to cover the invention in whatever form it may be embodied.

In the accompanying one sheet of drawings Figure 1 is a view partly in section of two pipe ends set at an angle to each other in accordance with this invention.

Figure 2 is a view on a smaller scale of two joined pipes showing the method of drawing and holding the pipes together, and means of controlling the weld metal while welding.

Figure 3 is a view in section of the expanding rolls for forming the spheroidal shape on the pipe ends.

Figure 4 is a plan view on a larger scale of the ring for controlling the weld metal.

Figure 5 is a modified form of the spheroidal pipe ends to be welded.

The ends 1 and 2 are expanded by rolls or other means to the spheroidal form shown at 3 and 4.

The end of the pipe 2 is adapted to fit into the expanded portion 3 of the pipe 1, and the center 6 is the center of both spherical portions. The end 7 of the pipe 2 telescopes past the center 6 of the spherical portions so that the portion 3 will overlap the portion 4.

This construction allows the pipe ends to be drawn tightly together and welded in that position at the joint 8.

In Figure 2 means are shown for drawing the pipes together which consist of the rings 9 and 10 adapted to engage the expanded portions 3 and 4, and be drawn together by the bolts 11 and 12, and the threaded nuts 13 and 14.

Any means can be used for drawing the pipes together, but the means shown is simple and powerful. To make a channel 15 for the weld metal, a copper ring 16 having a backing ring 17 is used. These rings are fastened together in any suitable manner, such as the copper rivets 17. This composite ring is preferably made in two parts held together by the bolts 19 and 20 so it can be placed or removed readily.

Figure 3 illustrates the method of shaping the spheroidal ends of the pipes. As different shaped rolls are required for the meeting pipes the rolls are removably mounted on the taper shafts 23 and 24 of the beading tool, not shown, and held in place by the nuts 25.

In the form shown in Figure 5 of the spherical portion 26 the outside pipe has the straight portion 27 extending past the center line 28 of the spherical portion. The portion 29 is the same as the part 4 in Figure 1.

The complete operation consists of first heating the ends of the pipe and rolling them out to the forms described, and then inserting the end of pipe 2 in the overlapping portion of pipe 1, then placing on the rings 9—10 and bolts 11—12 to draw the pipes tightly together. When drawn up as tight as possible the ring 16 is placed in position and the conventional weld made, with the weld metal in the channel 15.

A decided advantage of this method of welding a pipe joint consists in the means it affords for drawing the pipes together with the pipes in a straight line or at an angle. In the butt welding method heretofore used it is very difficult to align the ends and draw them together to afford a tight welding surface.

Having thus described my invention, what I claim and desire to secure by Letters Patent of the United States is as follows:

1. The method of joining telescoping pipe ends, consisting of encircling the inner pipe end with a separable composite ring arranged adjacent the exposed edge of the outer pipe end and welding the said ends together between said edge and said ring.

2. The method of joining pipes having telescoping frictionally contacting spheroidal ends, consisting of holding said ends in fixed engagement; encircling the smaller of said ends with a separable composite ring and welding the edge of the outer end to the body of the inner end adjacent said ring.

In testimony whereof I have hereunto set my hand this 9th day of July A. D. 1929.

HUGH F. BROWN.